Nov. 17, 1936.    J. F. CALVERT    2,061,503
METHOD OF DIMINISHING CORONA AND INSULATION HEATING AT THE ENDS OF SLOTS
Original Filed April 12, 1934
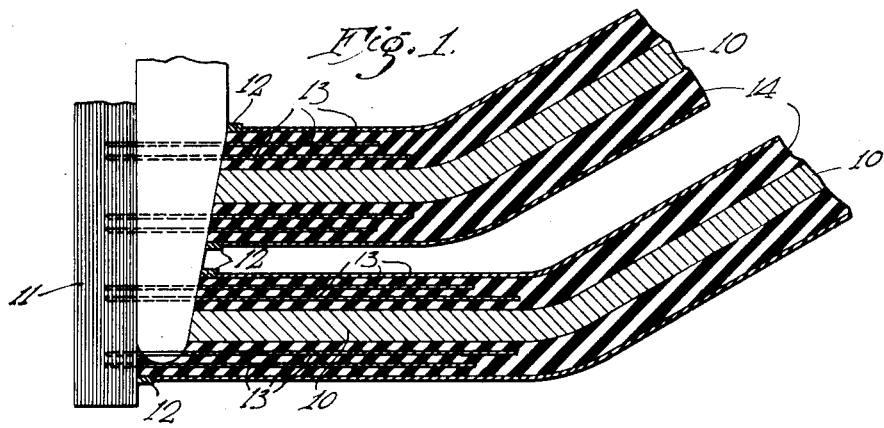
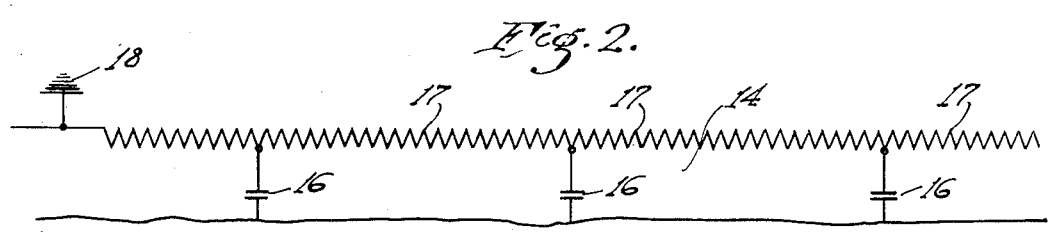
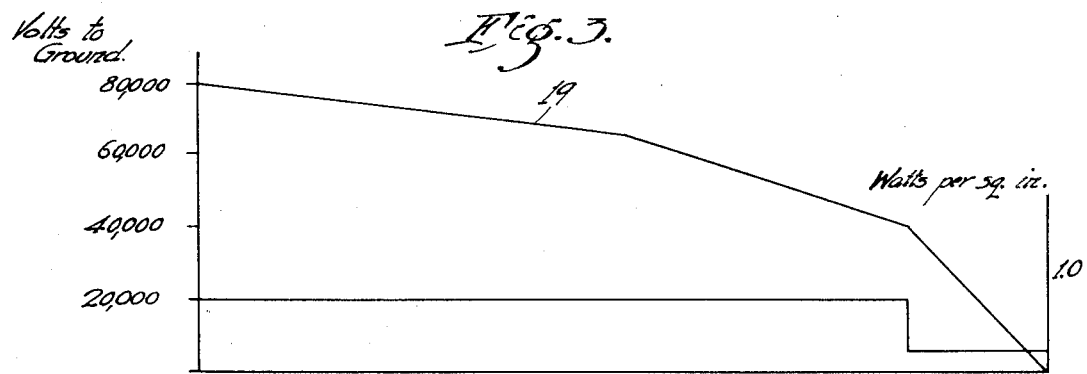
WITNESSES:
INVENTOR
John F. Calvert.
BY Ezra W. Savage
ATTORNEY Patented Nov. 17, 1936

2,061,503

UNITED STATES PATENT OFFICE 2,061,503

METHOD OF DIMINISHING CORONA AND INSULATION HEATING AT THE ENDS OF SLOTS

John F. Calvert, Irwin, Pa., assignor to Westinghouse Electric & Manufacturing Company, East Pittsburgh, Pa., a corporation of Pennsylvania Original application April 12, 1934, Serial No. 720,223. Divided and this application July 31, 1936, Serial No. 93,620

5 Claims. (Cl. 171—206)

The invention relates generally to the protection of insulated conductors, and more particularly to the protection of the insulated conductors employed in the coils of dynamo-electric machines.

This application is a division of application, Serial No. 720,223, filed April 12, 1934.

The object of the invention is to produce a voltage gradient along the outside surface of an insulated conductor which, for test and normal voltage ratings, will restrict the electrostatic discharge without causing harmful heating of the insulation.

Other objects of the invention will, in part, be obvious and, in part, appear hereinafter.

The invention accordingly is disclosed in the accompanying drawing and comprises the features of construction, combination of elements and arrangement of parts which will be exemplified in the structure hereinafter set forth and the scope of the application of which will be indicated in the claims.

For a fuller understanding of the nature and the objects of the invention, reference may be had to the following detailed description taken in conjunction with the accompanying drawing, in which:

Figure 1 is a view partly in side elevation and partly in section of a portion of a generator armature showing a protecting system applied in accordance with this invention.

Fig. 2 is a diagram illustrating the characteristics of a conductor having the protective system of this invention applied, as shown in Fig. 1, and Fig. 3 is a copy of curves showing the watts consumed per square inch with surface area and the voltage gradient obtained along the end loop portions of the coils of a dynamo-electric machine when provided with a protective system arranged in accordance with that shown in Fig. 1.

Referring now to the drawing, and Fig. 1 in particular, the conductors or windings 10 are illustrated as extending beyond the armature iron 11 forming what may be described as end loop portions. In winding dynamo-electric machines insulated conductors are carried in slots provided in the armature iron 11. The size of the insulated conductor employed in winding the armature will depend upon the conditions to be met.

It is common practice in present-day construction of dynamo-electric machines to coat the armature windings with a conducting material which makes electrical contact with the iron. Many suitable conducting materials are available. Good results have been obtained by using a material known to the trade as aquadag. This material is essentially a mixture of a graphite and water paint.

In this specification, aquadag will be referred to as a conducting material. When painted on windings in the manner in which it is utilized in the present invention its resistance is of the order of 100 to 3000 ohms per square inch of surface area with the paint thickness employed.

In the illustration, Fig. 1, the aquadag 12 is shown as extending slightly beyond the armature iron, but this is not essential for the application of the present protective system. However, in many instances, satisfactory results are obtained by extending the aquadag slightly beyond the iron to prevent the concentration of voltage at a point adjacent the iron 11.

In the modification illustrated in Fig. 1, a part of the semi-conducting material 13 is embedded in the insulation of the insulated conductor employed in winding the armature. In the modification illustrated, three layers of semi-conducting material 13 are provided, one layer is applied to the surface of the insulated conductor while the other two layers are embedded in insulation 14 one-third and two-thirds of the depth of the insulation, respectively. More than three layers may be employed and spaced according to the same rule.

The embedded layers 13 of semi-conducting material are of different lengths. The closer the semi-conducting layers are to the copper 10, the further they extend beyond the point of support. As shown, the layers 13 extend well under the armature iron.

The embedding of the semi-conducting material in the insulation may be effected when the conductor is being wound with insulating tape. There are many suitable semi-conducting materials that may be employed with success. In experiments carried on to determine the utility of this invention the semi-conducting material applied was in the nature of a paint. This paint was prepared by carefully baking wood to provide a predetermined grade of charcoal which is ground in a ball mill to the required fineness and then mixed with an air-drying varnish and gasoline.

The semi-conducting material may be applied to insulated conductors whether employed as an armature winding or otherwise in different manners. It has been found satisfactory in some instances to apply the semi-conducting material to a tape, and apply the tape as the conductor is being wound with insulation or taped as it is generally described.

It has been found that the ohmic resistance varying from $1 \times 10^6$ ohms to $1500 \times 10^6$ ohms per square inch of conductor surface gives satisfactory results with the thickness of paint films employed. However, it is to be understood that it is not required that such values be adhered to since good results may be obtained under the different operating conditions with values which are entirely different.

When coils are provided with a semi-conducting material in the manner illustrated and described, the voltage on the insulated surface of the conductor is so distributed that there is no voltage gradient anywhere on the surface of the insulated conductor which will cause an electrostatic discharge or heating of the insulation, which may cause deterioration.

In tests made with this modified form, insulating layers ranging from $16 \times 10^6$ ohms to $1500 \times 10^6$ ohms per square inch of conductor surface, with the thickness of paint film employed, were employed with good results. It is to be understood that these resistance values may be varied greatly to meet operating conditions.

When semi-conducting material is applied to the insulated conductor, as shown in Fig. 1, the result obtained is substantially that illustrated by the circuit in Fig. 2, that is, between the copper of the conductor and the outside surface of the insulation there is the equivalent of a plurality of condensers 16 arranged in parallel circuit relation representing the insulation and connected to a plurality of resistors 17 connected in series circuit relation representing the semi-conducting material 13. The resistors are grounded as shown at 18 through the aquadag to the armature iron.

An armature coil for a dynamo-electric machine was built in accordance with this invention. One half was protected as shown in Fig. 1 of the parent application Serial No. 720,223, while the other half was arranged as in Fig. 1.

A voltage gradient such as disclosed at 19 in Fig. 3 was calculated for the arrangement shown in Fig. 1 and when this coil was tested there was neither visible electrostatic discharge nor heating which would damage the insulation, which shows that energy is dissipated in each section of semi-conducting material. The heating of the insulation was at the rate of about 1.0 watt per square inch of surface area which was not harmful during a one minute test. Were the test for a longer time, the arrangement could be modified to give less heating without corona discharge.

The resistance of the sections of the semi-conducting material applied to the insulated conductor ranged from $11 \times 10^6$ ohms per square inch to $680 \times 10^6$ ohms per square inch for the thickness of the paint film employed. When this coil was being tested there was no visible corona discharge, and since the heating was low, the method of applying the semi-conducting material was proved to be very satisfactory. The coil for a dynamo-electric machine tested was designed for an operating voltage of about 30,000 volts. During the test, the coil was operated for a minute at twice normal rated voltage plus 20,000 volts, which in the above test would mean about 80,000 volts. The test results demonstrate the value of the invention and is a solution of a problem in the protection of insulated conductors particularly those utilized in winding the armatures of dynamo-electric machines.

In conclusion, it is pointed out that while the illustrated example constitutes a practical embodiment of the invention, I do not limit my invention to the exact details shown, since modifications of the same may be considerably varied without departing from the spirit of the invention as defined in the appended claims.

I claim as my invention:

1. A system for protecting an insulated conductor carried by a support comprising layers of semi-conducting material embedded in the insulation of the insulated conductor, the semi-conducting material being disposed to extend beyond the support, the layer of semi-conducting material nearest the conductor extending further beyond the support than the other embedded layer to cooperate in distributing the voltage along the surface of the insulation of the conductor to restrict corona discharge and heating of the insulation.

2. A system for protecting an insulated conductor carried by a support comprising layers of conducting material embedded in the insulation of the insulated conductor and extending beyond the support, the layer of semi-conducting material nearest the conductor extending further beyond the support than the other embedded layer and a semi-conducting material carried on the surface of the insulation on the insulated conductor and extending beyond the layers of conducting material.

3. A system for protecting an insulated conductor carried by a support comprising a conducting material applied to the insulated conductor and extending beyond the support, layers of a semi-conducting material embedded in the insulation of the insulated conductor, the layer of semi-conducting material next the conductor extending further beyond the support than the other embedded layer to cooperate in distributing the voltage to give a voltage gradient along the insulated conductor that will restrict corona discharge and the heating of the insulation when the conductor is energized.

4. A system for protecting an insulated conductor carried by a support comprising layers of semi-conducting material embedded in the insulation of the insulated conductor, the semi-conducting material being disposed to extend beyond the support, the layer of semi-conducting material nearest the conductor extending further beyond the support than the other embedded layer, a layer of semi-conducting material applied to the surface of the insulation of the insulated conductor and extending beyond the support to cooperate in distributing the voltage along the surface of the insulation of the conductor to restrict corona discharge.

5. In a dynamo-electric machine, in combination, an armature iron provided with a plurality of slots, an insulated conductor disposed in the slots forming the armature winding, the insulated conductor extending beyond the iron forming end loop portions, a conducting material applied to the portions of the armature winding disposed in the slots, layers of a semi-conducting material embedded in the insulation of the end loop portions, the layers of semi-conducting material being of different lengths and extending into the slots in the armature iron the layer of semi-conducting material next the conductor extending farthest outwardly and cooperating to produce a voltage gradient along the surface of the windings which will not cause destructive electrostatic discharges or injurious heating of the insulation.

JOHN F. CALVERT.